Feb. 14, 1950     V. E. SPROUSE     2,497,242
FLANGED HUB
Filed Aug. 19, 1946
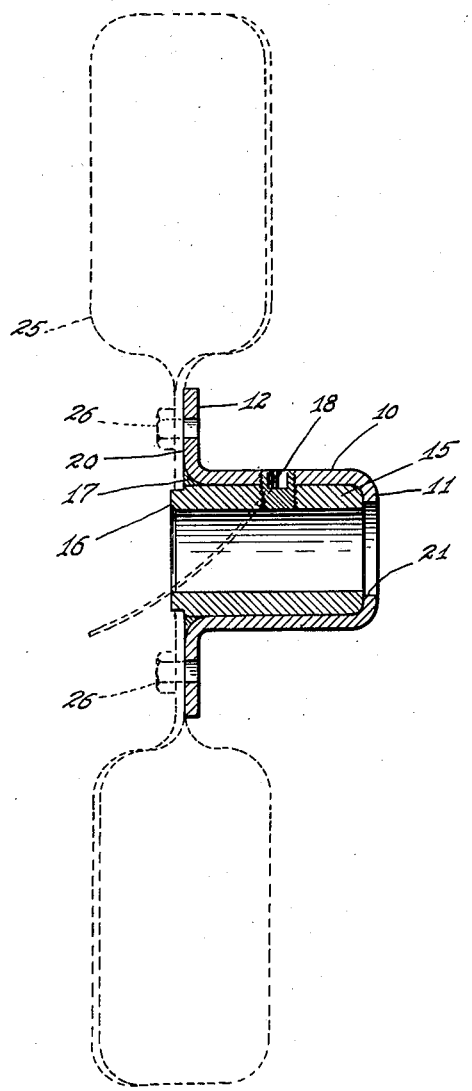
INVENTOR.
VERNER E. SPROUSE,
BY
ATTORNEYS.

Patented Feb. 14, 1950

2,497,242

UNITED STATES PATENT OFFICE 2,497,242

FLANGED HUB

Verner E. Sprouse, Columbus, Ind.

Application August 19, 1946, Serial No. 691,603

4 Claims. (Cl. 170—173)

1

This invention relates to hubs adapted for use in mounting fans or other elements on a shaft, and more particularly to a hub having an outwardly projecting annular flange to which the mounted element is affixed. It is the object of my invention to produce a flanged hub which can be manufactured at materially less expense than is involved in the manufacture of prior hubs of which I am aware. A further object of my invention is to produce a hub which will possess all the strength and rigidity of a unitary hub but which can be manufactured at lower cost.

In carrying out my invention, I form the hub of two pieces, one a sheet-metal stamping and the other a bushing. The stamping is generally cup-shaped, has a cylindrical body within which the bushing has a press fit, and is provided at its open end with the annular flange to which the hub-mounted element may be secured. The bushing is located within the body of the cup but projects therefrom axially beyond the outer face of the hub-flange. Desirably, the bushing, after being pressed into the hub, is welded, brazed, or soldered in place, and the projecting end of the hub is machined, as in a lathe, to provide an outwardly presented concentric surface adapted to serve as a pilot for the hub-mounted element. The outer face of the hub-flange may be faced at the same time the projecting end of the hub is turned in order to provide it with a surface accurately normal to the hub-axis.

In the accompanying drawing, which illustrates a hub embodying my invention, the single figure is a side elevation in partial section of a hub.

The hub shown in the drawing comprises a sheet-metal stamping drawn into a general cup-shape to provide a cylindrical body 10, an end wall 11 at one end of the body, and an outwardly projecting annular flange 12 at the other end of the body. A bushing 15 has a press fit within the cylindrical body 10, seats against the bottom wall 11, and projects axially beyond the open end of the cup as indicated at 16.

After the stamping and the bushing have been assembled by pressing the bushing into the body, they are further secured together by welding, brazing, or soldering. Preferably, the junction of the cylindrical hub-body 10 and the flange 12 has a considerable radius, so that when the hub and bushing are assembled an annular groove 17 of general V-shaped cross section will be provided around the projecting portion of the bushing. This groove forms a convenient channel for the reception of solder, spelter, or weld-metal. Preferably, the reaming or other final finishing operation on the bore of the bushing 15 is performed after the bushing has been secured in the body 10. After the bushing and stamping have been assembled, a set-screw hole 18 is drilled and tapped.

The assembly is then placed in a lathe and the exterior of the projecting bushing-portion 16 is turned to be accurately concentric with the bushing-bore; and, at the same time, the outer face 20 of the flange 12 is faced to be accurately normal to the bushing-bore. Prior to assembly of the bushing and stamping, the bottom wall 11 of the stamping may be punched to provide a hole 21 which is desirably slightly larger than the bore of the bushing in order to avoid the necessity of machining it after assembly has occurred.

The element to be mounted on the hub, in this case a fan 25 shown in dotted lines, is located radially by being provided with an axial opening receiving the pilot 16 and is secured against the flange-face 20, as by screws 26. While I have shown the hub as employed to support a fan, it will be obvious that it can be used equally well in the mounting of other elements. If the hub and the element mounted upon it are not to rotate with a shaft received in the bushing-bore, the set-screw hole 18 may of course be omitted.

I claim as my invention:

1. In combination, a rotatable element having an axial bore and an end face perpendicular to the axis of said bore; a hub for supporting said rotatable element, said hub comprising a sheet-metal stamping having a generally cylindrical, hollow body portion, an annular flange extending radially outwardly at one end of said body portion, a second annular flange extending radially inwardly at the other end of said body portion; a bushing secured within said body portion, one end of said bushing abutting said inwardly extending flange and the opposite bushing-end projecting axially beyond the outwardly extending flange, a face on the projecting portion of said bushing coplanar with the outer face of said outwardly extending flange, and a reduced diameter end on said projecting portion of said bushing, said reduced diameter end fitting within the bore of said rotatable element with the said flange face engaging said end face of the rotatable element.

2. A composite hub for mounting a centrally bored fan element, comprising a member having a generally cylindrical, hollow body portion defining an axial bore therein, an annular abutment flange extending in part radially inwardly across said bore at one end of said body portion, a second annular flange extending outwardly at the other end of said body portion, and a bushing having a press fit within said body portion and being secured thereto, said bushing being seated at one end against said abutment flange and extending therefrom through said bore to project axially at its other end beyond the said second flange, the projecting portion of said bushing having an axially extending surface concentric with the axis of said bushing and a radially extending face coplanar with said second flange.

3. A fan spider and a composite hub therefor, said hub comprising a sheet-metal stamping having a generally cylindrical, hollow body portion, an annular flange extending inwardly at one end of said body portion, a second annular flange extending outwardly at the other end of said body portion, and a bushing secured within said body portion, said bushing seating against the first named flange and projecting axially outward beyond the last named flange, the projecting portion of said bushing entering said spider to center it on said bushing, and said spider bearing axially against said last named flange.

4. A fan spider having a central bore and a composite hub for mounting the spider, said hub comprising a sheet-metal stamping having a generally cylindrical, hollow body portion, an annular flange extending inwardly at one end of said body portion, a second annular flange extending outwardly at the other end of said body portion, and a bushing secured within said body portion and seating against said first named flange, said bushing projecting axially beyond the last named flange, a shoulder on the projecting portion of said bushing in the plane of the outer face of said last named flange for locating the spider axially of the bushing to have the spider bear adjacent the periphery of said bore against the shoulder and over an outer radial portion against said flange.

VERNER E. SPROUSE.

REFERENCES CITED

The following references are of record in the file of this patent:

UNITED STATES PATENTS

| Number | Name | Date |
|---|---|---|
| 671,427 | Anderson | Apr. 9, 1901 |
| 927,311 | Anderson | July 6, 1909 |
| 1,129,989 | Kelsey | Mar. 2, 1915 |
| 1,137,240 | Sparks | Apr. 27, 1915 |
| 1,309,804 | Kelsey | July 15, 1919 |
| 1,971,433 | Tartrais | Aug. 28, 1934 |
| 2,156,047 | Arnold | Apr. 25, 1939 |
| 2,292,346 | Bahr | Aug. 11, 1942 |

FOREIGN PATENTS

| Number | Country | Date |
|---|---|---|
| 247,067 | Great Britain | Feb. 11, 1926 |
| 453,626 | Great Britain | Sept. 15, 1936 |